(12) United States Patent
Lupke et al.

(10) Patent No.: US 8,146,620 B2
(45) Date of Patent: Apr. 3, 2012

(54) NON-CIRCULAR PIPE PROFILE

(76) Inventors: Manfred A. A. Lupke, Thornhill (CA); Stefan A. Lupke, Thornhill (CA)

( * ) Notice: Subject to any disclaimer, the term of this patent is extended or adjusted under 35 U.S.C. 154(b) by 127 days.

(21) Appl. No.: 12/656,655

(22) Filed: Feb. 12, 2010

(65) Prior Publication Data

US 2010/0200100 A1 Aug. 12, 2010

(30) Foreign Application Priority Data

Feb. 9, 2009 (CA) ...................................... 2653137

(51) Int. Cl.
*F16L 11/00* (2006.01)

(52) U.S. Cl. .. 138/121; 138/109; 138/177; 138/DIG. 11

(58) Field of Classification Search ............ 138/121, 138/122, 109, 177, 178; 428/36.9
See application file for complete search history.

(56) References Cited

U.S. PATENT DOCUMENTS

| | | | | |
|---|---|---|---|---|
| 3,330,303 | A * | 7/1967 | Fochler | 138/120 |
| 3,603,905 | A * | 9/1971 | Schuttloffel | 333/241 |
| 3,681,925 | A * | 8/1972 | Schmunk et al. | 405/49 |
| 4,465,404 | A * | 8/1984 | Heintzmann et al. | 405/288 |
| 6,021,816 | A * | 2/2000 | Jeltsch et al. | 138/121 |
| 6,223,777 | B1 * | 5/2001 | Smith et al. | 138/109 |
| 7,063,108 | B2 * | 6/2006 | Toliver et al. | 138/121 |
| 7,253,361 | B2 * | 8/2007 | Nishijima et al. | 174/72 A |
| 2005/0039810 | A1 * | 2/2005 | Toliver et al. | 138/121 |
| 2005/0092383 | A1 * | 5/2005 | Cheng et al. | 138/121 |

FOREIGN PATENT DOCUMENTS

| CA | 2238878 A1 | 10/2005 |
|---|---|---|
| DE | 2262994 A1 | 7/1974 |

* cited by examiner

*Primary Examiner* — Patrick F Brinson

(57) ABSTRACT

A corrugated pipe having a non circular in cross section profile and at least one generally elongate wall section is improved by using a variable height corrugation in the length of the elongate wall segment. The variable height corrugation is of a greatest height at a center portion thereof and decreases in height towards the end points of the elongate wall segment. A spanning type truss arrangement is formed that opposes inward deflection of the straight wall segment.

16 Claims, 4 Drawing Sheets

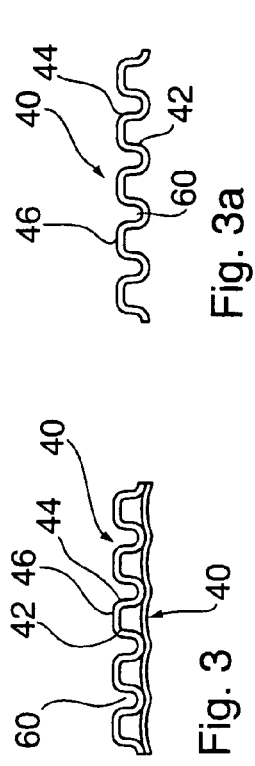
Fig. 3
Fig. 3a
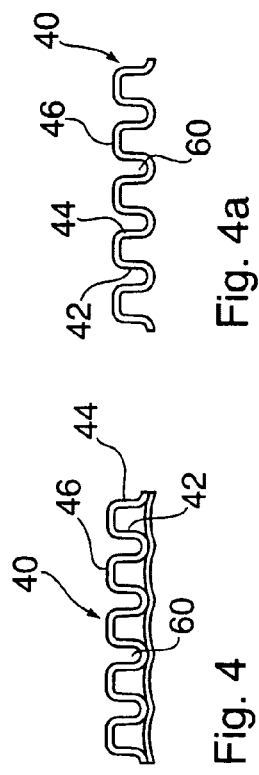
Fig. 4
Fig. 4a
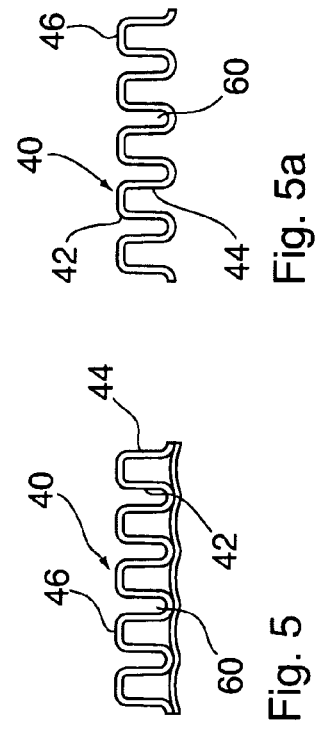
Fig. 5
Fig. 5a
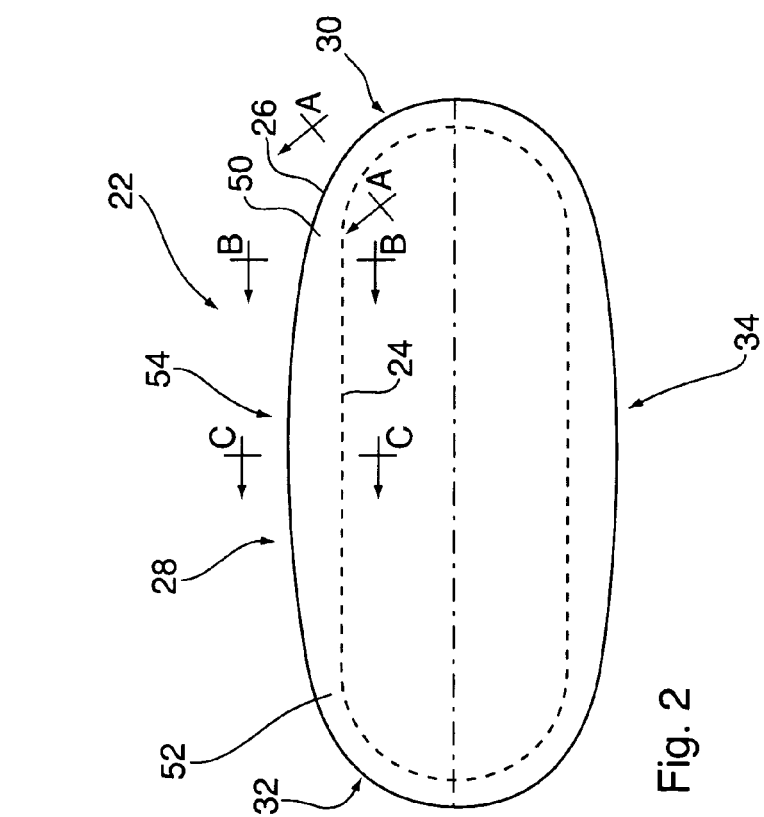
Fig. 2

Fig. 7 Section D-D

Fig. 8 Section E-E

Fig. 9 Section F-F

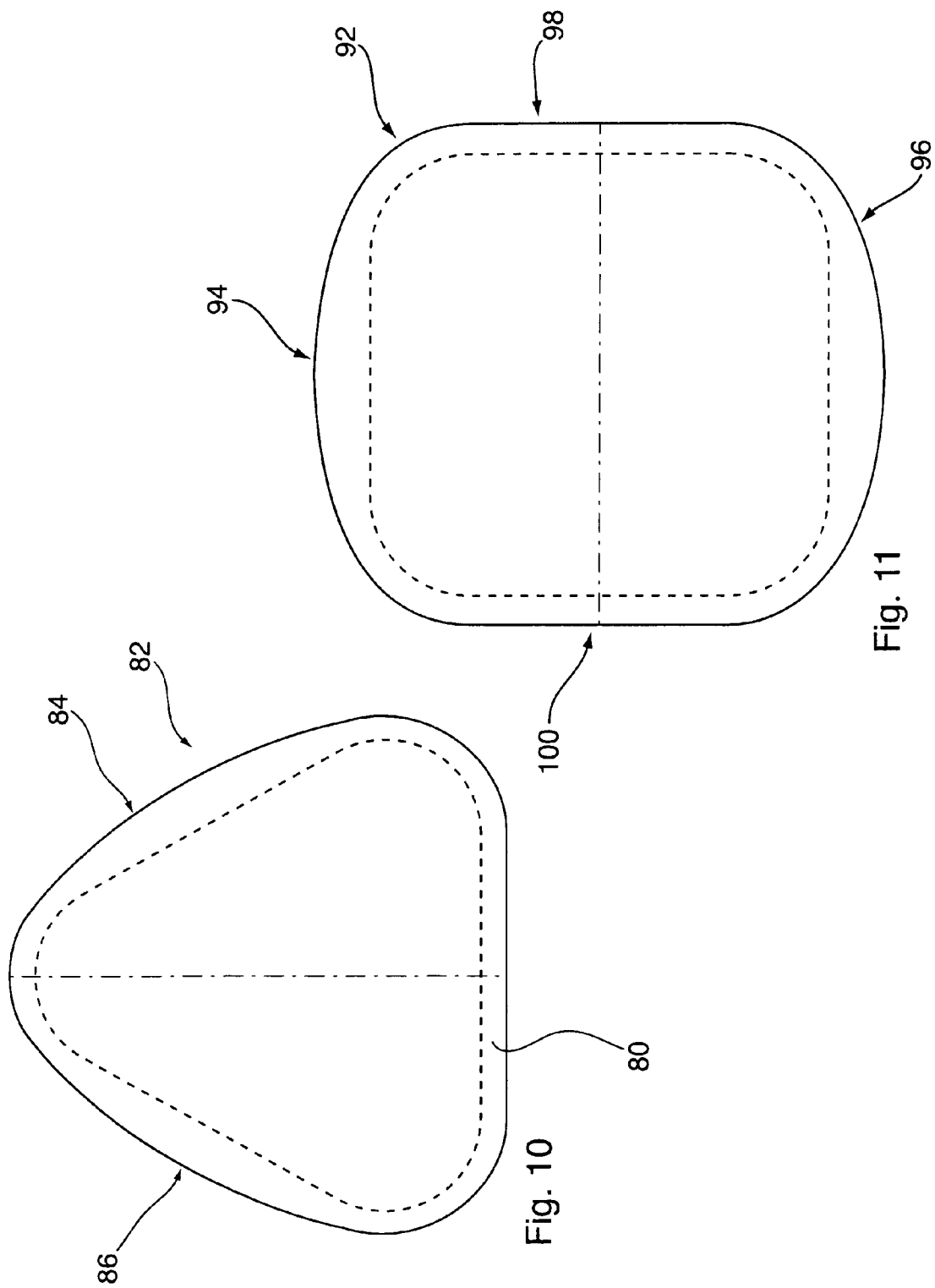

NON-CIRCULAR PIPE PROFILE

FIELD OF THE INVENTION

The present invention relates to non-circular shaped corrugated plastic pipe, and in particular relates to an improved rib configuration for reducing pipe deformation that may occur during cooling at the time of manufacture and to provide improved strength during use of the product.

BACKGROUND OF THE INVENTION

Corrugated plastic pipe is typically manufactured using an extrusion process involving a moving mold tunnel that determines the exterior shape of the pipe. The mold blocks are designed to apply a vacuum force to the extruded plastic to draw the plastic into contact with the interior shape of the mold blocks. These mold blocks are also designed to remove heat from the extruded plastic to generally set the corrugated pipe at the exit of the mold block tunnel.

In the case of corrugated extruded pipe having a double walled thickness, a first extruded plastic stream is acted upon by the moving mold tunnel to define the exterior profile and a second plastic stream is extruded to form an inner wall of the corrugated pipe. In the manufacture of double wall corrugated pipe, an interior cooling plug may also be used to assist in cooling the plastic by removing heat from the interior of the pipe.

Single walled corrugated plastic pipe and double walled corrugated plastic pipe are often used in drainage application and these pipes are typically buried and subject to substantial compressive forces. Conventional single or double walled corrugated plastic pipes are designed to withstand these compressive forces, and are commonly made of a circular cross section.

Corrugated plastic pipes have also been used for other applications such as conduit applications for wiring. These conduits may be imbedded in a concrete floor, for example, and are subject to less compressive forces. For conduit applications, the pipe may be made of a flexible material to allow for flexing or changes in direction of the conduit. Conduits may also be made of a more rigid material to improve the structural characteristics thereof. Conduits are also used as protective sheaths for wiring in non buried applications.

Double walled corrugated pipe is also practical for use as a ventilation duct. The outer corrugations of the pipe provide improvements in the structural characteristics of the product, and the smooth inner wall of the pipe provides an effective channel for fluid flow.

In the manufacture of corrugated plastic pipe, whether it is single walled or double walled, the ability of the moving mold tunnel to remove heat from the extruded plastic and set the plastic is critical to the quality control. The product at the exit of the moving mold tunnel must be at least partially set to reduce undesired deformation. The product at this time is subject to continued shrinkage as the plastic cools and the product is also subject to gravitational forces that can cause distortion.

In the manufacture of non-circular cross section corrugated pipe, and in particular in the manufacture of corrugated plastic pipe having a relatively straight wall segment, there is a tendency for this straight wall segment to distort inwardly. This inward distortion is a function of the gravitational force on the straight segment during the cooling of the product, as well as the tendency for the plastic to shrink. In extruded corrugated plastic pipe formed with a significant straight wall section it is difficult to avoid this distortion while maintaining a satisfactory speed of manufacture. Inward distortion also reduces the performance of the product in use.

The present invention seeks to overcome a number of difficulties associated with the manufacture of corrugated plastic pipe of either single or double walled configuration in which the cross section includes a substantial straight section.

SUMMARY OF THE INVENTION

A pipe according to the present invention comprises a series of corrugations on an exterior surface thereof with the pipe having an interior passage of a non circular cross section with each corrugation having at least one generally elongate wall segment forming at least 20% of the circumference of the non circular cross section. Each generally elongate wall segment is defined by a variable height corrugation increasing in height towards a center portion of said elongate wall segment to form a spanning truss type structure shaped to oppose inward deflection of a central portion of the straight wall segment.

In an aspect of the invention, each corrugation in the elongate wall segment includes a straight interior surface aligned with interior surfaces of adjacent corrugations in said elongate wall segment, and forms an inner wall of the pipe bridging the corrugations.

In a further aspect of the invention, the pipe includes an outer circumferential shape having a width to height ratio of at least 2 to 1.

In an aspect of the invention, the non circular cross section has at least two generally straight wall segments.

In a preferred aspect of the invention, the straight wall segments form at least one pair of straight wall segments and the wall segments of each pair are generally parallel.

In a further preferred aspect of the invention, two of said generally straight wall segments are non parallel and connected by a curved corner connection segment.

In a preferred aspect of the invention, the corrugated pipe includes 3 generally straight wall segments interconnected to form a generally triangular cross section with rounded corners.

According to an aspect of the invention, the pipe includes at least two elongate wall segments of equal length and each elongate wall segment increases in height from each end of the straight wall segment towards a central portion of the straight wall segment.

According to a different aspect of the invention, the non circular cross section is of a triangular, square or rectangular shape.

In a preferred configuration of the invention, two generally straight wall segments of approximately equal length are provided.

In a preferred aspect of the invention, each straight segment has a generally straight interior wall extending in a length of the straight segment and an outer edge that arcs outwardly between opposed ends of the straight segment.

In a different aspect of the invention, each straight segment has an interior edge extending in a length of the straight segment that arcs inwardly between opposed ends of the straight segment.

A pipe according to the present invention includes a series of corrugations forming a first wall of the pipe with the pipe having an interior passage of a non circular cross section defined by a second wall of the pipe. The non circular pipe in cross section includes at least one generally elongate wall segment forming at least 20% of the circumference of the non circular cross section. Each generally elongate wall segment is defined by a variable height corrugation increasing in height towards a center portion of the elongate wall segment and cooperating with a straight wall segment of the second wall of the pipe to form a spanning truss structure opposing inward deflection of the second wall.

In an aspect of the invention, the cross section includes an opposing elongate section opposite the spanning truss structure. The opposing elongate straight section includes a corrugation of constant height forming part of the first wall of the pipe and a straight wall at an interior edge of the constant height corrugation.

In a different aspect of the invention, the opposing elongate straight section and the spanning truss structure include parallel interior surfaces joined by arced end wall segments.

BRIEF DESCRIPTION OF THE DRAWINGS

Preferred embodiments of the invention are shown in the drawings, wherein:

FIG. 2 is a cross sectional view through a corrugated pipe according to the present invention having modified ribs to oppose pipe distortion;

FIG. 3 is a cross sectional view through the pipe at line A-A;

FIG. 4 is a cross sectional view through the corrugated pipe at line B-B;

FIG. 5 is a cross sectional view through the corrugated pipe at line C-C;

FIG. 7 is a cross sectional view through the pipe wall at line D-D;

FIG. 8 is a cross sectional view through the wall of the pipe at line E-E;

FIG. 9 is a cross sectional view through the pipe at line F-F;

FIG. 10 is a cross sectional view of an alternate configuration of the pipe; and FIG. 11 is a cross sectional view through yet a further alternate configuration of the pipe.

DETAILED DESCRIPTION OF THE PREFERRED EMBODIMENTS

Figure 1:
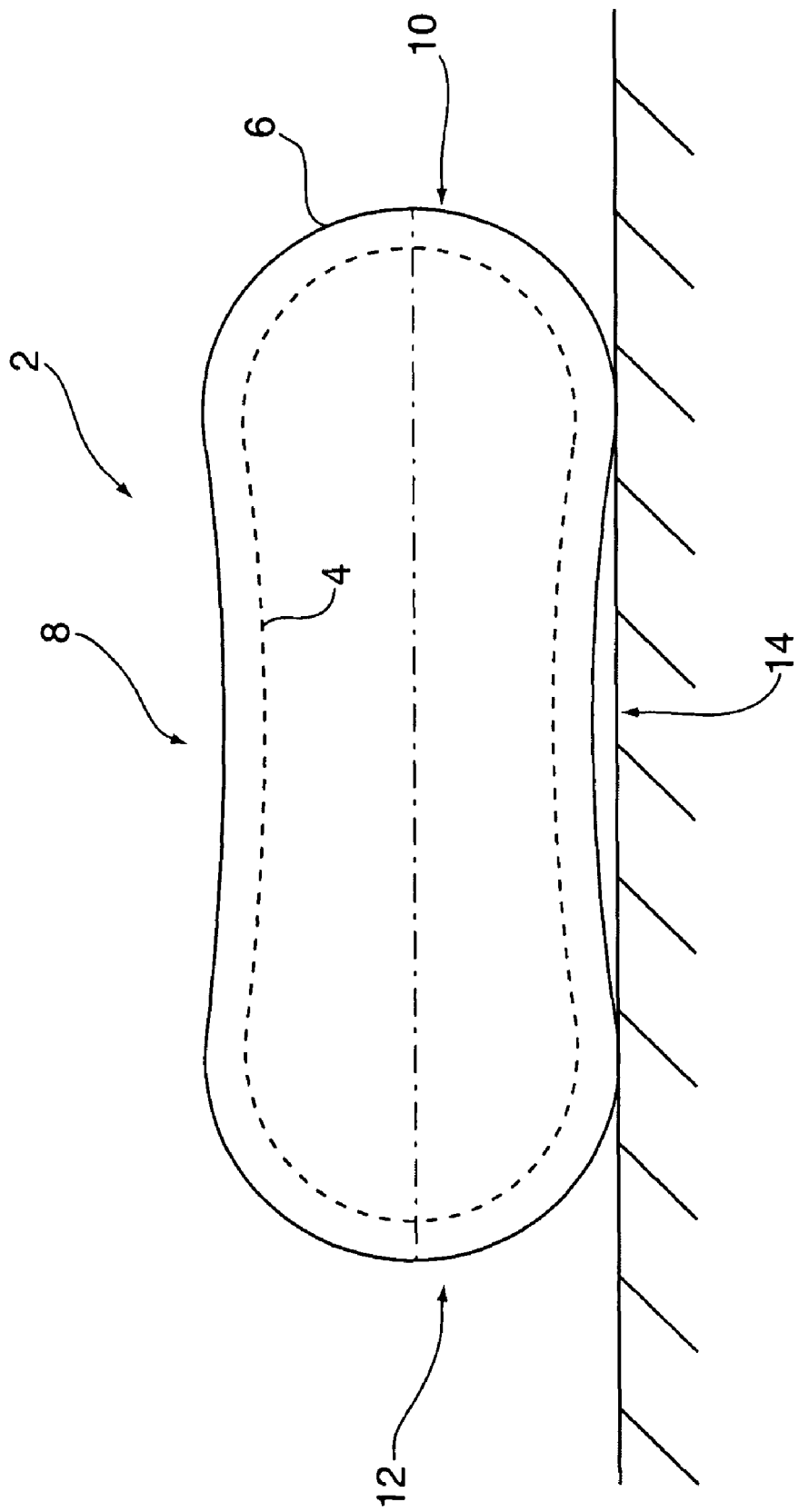
FIG. 1 is a cross sectional view through a prior art corrugated pipe where an inward distortion has occurred with respect to the upper wall of the pipe.

FIG. 1 is a cross sectional view through a prior art corrugated pipe 2 of a non-circular cross section where the corrugated pipe 2 includes an inner wall 4 and an outer wall 6. The corrugated pipe can be of a single walled construction or can be of a double walled construction. This non-circular cross section is elongate, and is defined by the top elongate segment 8, the curved side segments 10 and 12, and the bottom elongate segment 14. The corrugations are of a fixed height and size and provide improved structural characteristics. This type of corrugated pipe can be made in small sizes for use as an electrical conduit with the extrusion material selected to provide the desired properties. A relatively flexible material may be chosen to allow the conduit to flex. This type of cross section can also be used for ducting applications where higher structural characteristics are required. In this case, a double wall pipe configuration is preferred to provide a smooth interior conduit for improved fluid flow.

Double walled corrugated pipe is also used extensively for drainage applications where higher structural properties may be required.

In the manufacture of double wall corrugated pipe, plastic is extruded in a first plastic stream to allow forming of the exterior surface of the corrugated pipe (essentially the corrugations), and an interior wall is formed by a second stream of extruded plastic.

In contrast to the manufacture of generally circular cross section corrugated pipe of single wall, double wall or triple wall configuration, there is a tendency for cross sections having a significant elongate segment for the elongate to distort inwardly shortly after exiting a moving mold tunnel used to form the cross section. The plastic is still at a raised temperature, and the combined factors of continued cooling of the plastic (shrinkage) in addition to gravitational force acting on the top elongate segment creates a tendency for the top elongate segment to bow inwardly as shown in FIG. 1. There is also a tendency for the bottom elongate segment to bow inwardly. This inward bowing of the bottom segment is typically due to shrinkage.

The problems associated with shrinkage during cooling of the plastic are less problematic in circular-type cross sections, as the wall shrinks inwardly at generally a similar rate.

It is possible to control the manufacturing process to greatly cool the plastic within the mold tunnel, however the production rate is much slower, and as such, this solution is not commonly adopted.

The modified corrugated plastic pipe is shown as 22 in FIG. 2, and this pipe includes the inner wall 24, the outer wall 26, a top elongate segment 28, curved side segments 30 and 32, and the bottom elongate segment 34. In this modified structure, the corrugation at the center point of the top and bottom elongated segments (see section C-C) is of increased height. The height of the corrugation of the top segment progressively increases in height from each end point 50 and 52 towards the center point of the elongate segment shown as 54. The variable height corrugation of this shape forms a truss-like structure that opposes inward deflection of the inner wall 24 and the corrugation during cooling of the corrugated pipe. This truss type structure is useful with both single wall and double wall pipe as shown in the cross-sectional views of FIGS. 3 through 5 (section lines A-A, B-B, C-C respectively), showing a double wall corrugated pipe, and FIGS. 3a through 5a (section line A-A, B-B, C-C respectively) showing a single wall corrugated pipe.

This truss type structure avoids inward distortion during manufacture and also provides higher load carrying capability during use of the product. The truss type structure distributes the load to the stiffer edge portions and reduces inward distortion under load. The truss type structure effectively distributes the material used to form the exterior surface of the straight segment to provide higher strength at the center of the truss.

It is also preferable that the corrugations 40 include side walls 42 and 44 which are relatively steep with these side walls being joined by the top wall 46. The top wall 46 is generally parallel to the interior wall 24 of the double walled pipe. Basically, the corrugations are relatively flat on the top surface, and include relatively steep side walls. Corrugations are separated from one another by the gap portion shown as 60.

The height of the corrugation 40 at the end points 50 and 52 is of a first height, whereas the height of the corrugation at the center point 54 is of a second height where the ratio of the second height to the first height is greater than two to one. Typically, this ratio will be in the range of 2 to 1 to 3 to 1.

As can be appreciated from the cross sectional view of FIG. 2, the corrugation in the top elongate segment and the bottom elongate segment form a truss-like structure that serves to maintain the inner wall in the desired planar configuration, and avoids inward distortion thereof. This maintains the desired cross section of the double walled corrugated pipe throughout its length and improves the characteristics with respect to fluid flow. Typically, the ratio of the length of the top elongate segment to the height of the structure is at least two to one. With this truss type structure less distortion occurs and production speeds can be maintained.

Figure 6:
FIG. 6 is a cross sectional view through an alternate pipe embodiment.
Figure 6:
Figure 6:
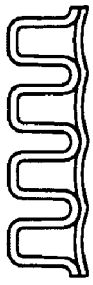
Figure 6:
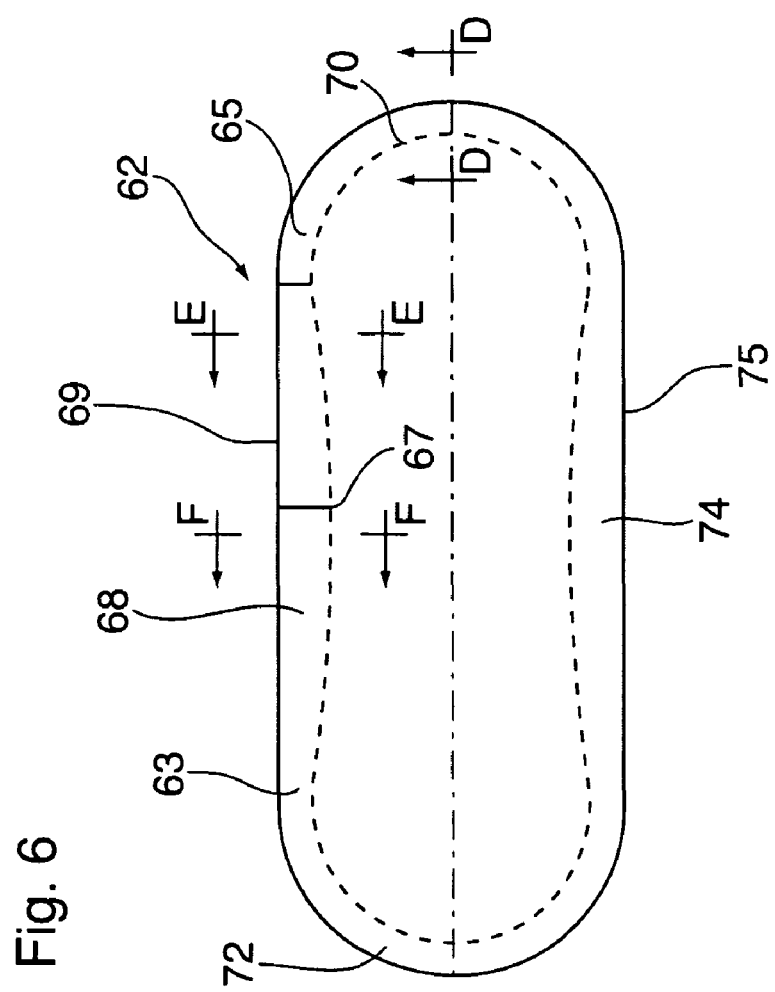

A further modified pipe structure 62 is shown in FIG. 6 and in this case, the top elongate segment 68 and the corresponding bottom elongate segment 74 have the reinforcing corrugation extending inwardly to provide an inverse truss arrangement. In this embodiment, the top surface 69 and the bottom surface 75 are the surfaces that would have a tendency to distort and this truss arrangement maintains the desired parallel surface. This is particularly valuable if it is desired to stack the corrugated pipes one on top of the other, for example, or to have the pipe supported on a flat surface.

The sectional views of FIGS. 7 through 9 (section lines D-D, E-E, F-F respectively) again show the relative size of the corrugations and the progressive increase in height of the corrugation from the end points 63 and 65 towards the center point 67 of the top or bottom elongate segments.

A further modified corrugated pipe structure 82 is shown in FIG. 10. In this case, the non-circular corrugated pipe section is generally triangular, and two side walls 84 and 86 of the triangular section have been reinforced with the truss-type arrangement as described with respect to FIG. 2. It would also be possible to include this type of reinforcing on the bottom segment 80 (conventional constant height corrugation) if desired. As previously indicated, there is less of a tendency for the bottom surface to distort inwardly during the manufacturing process. Basically, this inward distortion is partially opposed by gravity acting on this wall segment, whereas the top wall segment has gravity biasing the inward distortion as well as the effects of shrinkage. Therefore, for some products, it may not be necessary to provide the reinforcing on one or more of the elongate segments.

A further modified pipe structure 92 is shown in FIG. 11, which is generally of a rectangular-like configuration. In this case, both the top and bottom wall segments (94, 96) have been reinforced with the truss-type arrangement. The side walls (98, 100) of the corrugated pipe 92 may not require reinforcing; however these walls can be reinforced if desired. It has been found that the side walls, probably because of their vertical orientation during the manufacture of the corrugated pipe and the subsequent support of the pipe as it cools and after leaving the moving mold tunnel, are not as prone to inward distortion.

As can be appreciated from the description and Figures the reinforcing truss arrangement can be used as part of an elongate segment (typically greater than 20% of the circumference) to oppose inward distortion. This approach is suitable for small size conduits for wire harness or protective sheath applications, to larger size ventilation ducts or fluid conduit applications, as well as large pipe applications.

The truss type structure, between the end points where the size of the corrugation is at a minimum or reduced size to the maximum size of the corrugation generally at the center of the straight segment, forms a shallow arc shape. This gradual increase in the size of the corrugation is easily formed using the vacuum force associated with the mold blocks and advantageously locates the material for improved strength. As can be appreciated, the shallow arc shape when compressed may move inwardly but stops prior to passing through the neutral axis, and remains in compression. This is in contrast to inward distortion of a straight section which bows inwardly and is more in tension.

Improved properties are realized using the truss type structure in these products.

Although various preferred embodiments of the present invention have been described herein in detail, it will be appreciated by those skilled in the art that variations may be made thereto without departing from the spirit of the invention or the scope of the appended claims.

The embodiments of the invention in which an exclusive property or privilege is claimed are defined as follows:

1. A double walled pipe comprising an inner pipe wall and an outer pipe wall, said outer pipe wall comprising a series of spaced annular corrugations about and extending outwardly of said inner pipe wall, said inner pipe wall having an interior passage of a non circular cross section with at least one generally elongate wall segment forming at least 20% of the circumference of the non circular cross section; and wherein each annular corrugation includes a truss type structure adjacent each generally elongate wall segment; said truss type structure of the corrugation being of a variable height that progressively increases in height from adjacent opposed ends of the elongate wall segment to a center portion of the elongate wall segment; said spanning truss type structure extending outwardly from said inner pipe section and opposing inward deflection of a central portion of the elongate wall segment; said spanning truss type structure merging with remaining portions of said corrugation that extend outwardly of said inner pipe section adjacent said opposed ends of said elongate wall segment.

2. A corrugated pipe as claimed in claim 1 wherein said pipe includes an outer circumferential shape having a width to height ratio of at least 2 to 1.

3. A corrugated pipe as claimed in claim 1 wherein said non circular cross section has at least two generally elongate wall segments and are straight.

4. A corrugated pipe as claimed in claim 3 wherein said elongate wall segments form at least one pair of straight wall segments with the wall segments of each pair being generally parallel.

5. A corrugated pipe as claimed in claim 3 wherein two of said generally elongate wall segments are non parallel and connected by a curved corner connection segment.

6. A corrugated pipe as claimed in claim 1 wherein said inner pipe wall includes 3 generally elongate wall segments interconnected to form a generally triangular cross section with rounded corners.

7. A corrugated pipe as claimed in claim 2 wherein the pipe includes at least two elongate wall segments of equal length.

8. A corrugated pipe as claimed in claim 1 wherein said non circular cross section is of a triangular, square or rectangular shape.

9. A corrugated pipe as claimed in claim 4 wherein said generally elongate wall segments are of approximately equal length.

10. A corrugated pipe as claimed in claim 2 wherein said elongate wall segments cooperate to form a generally rectangular or square cross section.

11. A corrugated pipe as claimed in claim 10 wherein said elongate wall segments are connected by curved segments.

12. A corrugated pipe as claimed in claim 1 wherein each elongate wall segment has an interior edge extending in a length of said elongate wall segment that arcs inwardly between opposed ends of said elongate wall segment.

13. A corrugated pipe as claimed in claim 2 wherein each elongate wall segment has a generally straight interior edge extending in a length of said elongate wall segment and an outer edge that arcs outwardly between opposed ends of said elongate wall segment.

14. A pipe with a series of corrugations forming a first wall of said pipe with the pipe having an interior passage of a non circular cross section defined by a second wall of said pipe; said non circular pipe in cross section having at least one generally elongate wall segment forming at least 20% of the circumference of the non circular cross section; and wherein each generally elongate wall segment is bowed inwardly and is supported by said corrugations that are of a variable height that increases towards a center portion of said inwardly bowed elongate wall segment and cooperating with said inwardly bowed elongate wall segment of said second wall of said pipe to form an inwardly extending spanning truss structure opposing inward deflection of said second wall.

15. A pipe as claimed in claim 14 wherein said non circular cross section includes two elongate wall segments to opposite sides of said non circular cross section.

16. A pipe as claimed in claim 15 wherein said opposed elongate wall segments are joined by arced end wall segments.

* * * * *